United States Patent [19]

Link et al.

[11] 3,869,613
[45] Mar. 4, 1975

[54] INFRARED GAS ANALYZERS
[75] Inventors: William T. Link; Edward A. McClatchie, both of Berkeley, Calif.
[73] Assignee: Akron Scientific Labs, Berkeley, Calif.
[22] Filed: Sept. 27, 1973
[21] Appl. No.: 401,214

Related U.S. Application Data
[63] Continuation of Ser. No. 222,635, Feb. 1, 1972, abandoned.

[52] U.S. Cl. .............................................. 250/343
[51] Int. Cl. .............................................. G01n 21/26
[58] Field of Search ........... 250/343, 344, 345, 346, 250/373

[56] References Cited
UNITED STATES PATENTS
3,678,262  7/1972  Herrmann........................... 250/343
3,679,899  7/1972  Dimeff................................ 250/343

Primary Examiner—Archie R. Borchelt
Assistant Examiner—C. E. Church
Attorney, Agent, or Firm—Spensley, Horn & Lubitz

[57] ABSTRACT

Infrared gas analyzers for measuring the presence of specific gas molecules in an unknown gas sample. The gas sample is illuminated by a source of infrared radiation and the radiation passing therethrough is directed to a single radiation detector. A unique absorption filter, generally comprised of a plurality of transparent chambers mounted and rotatable about an axis, is disposed so that the chambers may be caused to sequentially pass through the optical path of the infrared radiation.

The plurality of chambers are adapted so as to alternately filter out the characteristic absorption bands of the specific gas molecules being tested for, and to alternately pass radiation of the same energy content which will not be substantially absorbed by the gas being tested for. By comparing the magnitude of the sequential signals derived from the detector, an accurate measure of the specific gas molecules in the unknown sample may be determined. Various embodiments of the invention are disclosed.

18 Claims, 21 Drawing Figures

TOTAL ENERGY = B

TOTAL ENERGY = A

INFRARED GAS ANALYZERS

This is a continuation of application Ser. No. 222,635, filed Feb. 1, 1972, now abandoned.

BACKGROUND OF THE INVENTION

1. Field of the Invention

This invention relates to the field of nondispersive infrared gas analyzers.

2. Prior Art

Various forms of infrared gas analyzers are well-known in the prior art. These gas analyzers are characterized by the utilization of the infrared absorption characteristics of specific gas molecules, that is, the tendency of certain gas molecules to absorb infrared radiation of specific and distinct wave lengths so that the amount of a specific gas present in an unknown gas sample may be determined by measuring the amount of energy absorption of specific wave lengths by the unknown sample.

One type of infrared absorption gas analyzer is of the type wherein radiation from heaters passes through two gas tubes fitted with transparent windows into two chambers which are separated by a thin metal diaphragm. The two chambers are filled with the gas to be detected and energy is absorbed as radiation passes through them according to the nature of the infrared absorption of the gas in question. As the gas heats up in response to the energy absorbed thereby, an increase of pressure is produced, and any difference in pressure between the two chambers causes the diaphragm to deform. The diaphragm is adapted to form the movable plate of a variable capacitor. Thus, the motion of the diaphragm in response to the pressure difference gives rise to changes in capacitance which may be measured by suitable circuitry. If both gas tubes contain gas with no infrared absorption, and the radiation from the heaters is interrupted by a rotating shutter which admits light simultaneously to the two tubes, the pressure pulses in the two chambers will balance and no movement of the diaphragm will result. If some of the gas to be detected is passed into one of the absorption tubes, energy will be absorbed before it can reach the corresponding detecting chamber. This will cause the balance to be upset and the diapagm will vibrate at the frequency of interruption of the radiation and at an amplitude indicative of the amount of the specific gas in the tube.

The above described infrared gas analyzer is subject to many sources of error which substantially limit the accuracy that may be achieved with such devices. In essence, two optical paths are used, one generally containing a reference tube which may be caused to contain a vacuum, an infrared inert gas or a measured reference quantity of the gas to be detected, and the other tube containing the unknown gas sample. It is apparent from the above description that the sensor is actually a sensing means for detecting the difference in radiation of specific wave lengths of infrared radiation incident upon the controlled quantity of gas in each of the two chambers. Thus, it is important not only that the gas in the two chambers be substantially pure and caused to be of equal pressure, but that the attenuation of the specific absorption wave lengths for that gas be dependent only upon the absorption of those wave lengths by the gas contained in the two tubes and not by a change in optical characteristics of the apparatus, such as, by way of example, attenuation due to dirty transparent windows. Furthermore, it is extremely important that the amplitude of the radiation incident upon each of the two tubes be the same, a condition which is extremely difficult to control whether two radiation sources are used or a single radiation source with a beam splitting means, such as a half-silvered reflector, is used. Also, it should be noted that by far the most convenient broad band infrared radiator is comprised of a heated filament, and such radiators may not be electrically controlled so as to substantially vary the amplitude of radiation emitted thereby at any significant frequency. Characteristically, such radiators have a tendency to integrate the electrical signal applied thereto if such signal is above the range of one to ten cycles per second. Thus, since the value of the capacitance of the variable capacitance signal generator is very low, the impedance of the signal generator output will be extremely high unless the infrared radiation may be chopped at a much greater frequency than possible by the control of the input signal to the infrared radiator. Consequently, it is common to use mechanical choppers in the infrared radiation path to chop the radiation. However, such choppers induce a mechanical vibration into the system, and the sensing diaphragm, being sensitive to acceleration as well as pressure differences, senses this vibration, with the result that the vibration signal is confused with the gas concentration signal, thereby resulting in an inaccurate measurement.

Another type of infrared absorption gas analyzer is disclosed in U.S. Pat. No. 3,488,491, entitled "Filter Techniques for Gas Analyzers Employing an Inert Gas to Pressure Broaden the Absorption Spectrum of Gas Being Detected," issued on Jan. 6, 1970, to M. Schuman. In this analyzer a single infrared source of radiation is directed past a mechanical chopper, through an unknown gas sample and, after being reflected back through the gas sample, is passed through a beam splitter of the partially reflecting type so that two beams are created. Each of these beams are passed through one of two chambers so as to be incident upon a detector associated with the respective chamber. Thus, two detectors are used, each to measure the intensity of the radiation passing through the associated chamber. One chamber is filled with the gas to be detected in the unknown sample, typically at a pressure on the order of one atmosphere. The second chamber is also filled with the gas to be detected but at a substantially increased pressure. The chamber containing gas at a relatively low pressure will absorb infrared radiation of specific wave lengths incident thereon or, more precisely, will absorb infrared radiation incident thereon within very narrow absorption lines centered about the specific wave lengths characteristic of the gas. The higher pressure gas will also absorb infrared radiation in lines centered about the same, or substantially the same, specific wave lengths, but the absorption lines will be significantly broader than those of the gas in the lower pressure chamber, and of the gas in the unknown gas sample (assuming the unknown gas sample is not at an inordinately high pressure). If the unknown gas sample does not contain the gas in the two chambers, that is, the gas to be detected, the system will, in general, be caused to have a zero output, with both chambers absorbing a substantial amount of infrared radiation directed thereon within the respective absorption lines. However, if the unknown gas sample contains the gas to be detected, the unknown sample will absorb infrared radiation within the narrower absorption lines characteristic of the lower pressure chamber. Thus, the beams incident upon the two chambers will have a substantially reduced amount of radiation within these narrower lines and, therefore, the fraction of the beam incident upon the first chamber will not be substantially attenuated in passing through that chamber, since the gas in that chamber is only capable of absorbing those wave lengths already attenuated in the beam incident thereon. However, the portion of the beam incident upon the high pressure gas in the second chamber will be attenuated by the high pressure gas since that gas will absorb infrared radiation over lines which are substantially wider than that absorbed in the first chamber and in the unknown sample. Consequently, the balance between the two sensors will be disturbed and the difference in output of the sensors may be used as a measure of the gas concentration in the unknown sample.

The above-described gas analyzer has the advantage that a single beam in a single optical path is transmitted through the unknown gas sample and, therefore, the problem of balance in a plurality of infrared sources and in the optical qualities of a plurality of radiation paths is nonexistent, at least until the beam is split after having passed through the gas sample. However, there are a number of sources of error of such a device which limit the stability and accuracy of the device and which necessitate frequent calibration if reasonable accuracy is to be achieved. By way of example, the beam splitter may be subject to drift in the relative proportions of the beam that are transmitted and reflected. By way of example, half-silvered mirrors are subject to dirt, vapor condensation and oxidation, all of which will effect their performance. Also, the use of two sensors also creates a source of drift and instability since the gas concentration in the unknown gas sample is ultimately indicated by the difference in two relatively large signals derived from the two sensors. The sensors cannot be made to have identical sensitivity, that is, identical gains and, in fact, will characteristically exhibit different non-linearities which will make it impossible to match the sensors throughout a reasonable range of radiation intensity. Thus, though the sensors will properly create an output when the radiation incident upon one sensor changes in relation to the radiation incident upon the other sensor, a false signal will be created when the level of radiation incident upon both sensors changes proportionately, such as, by way of example, will occur due to changes in the intensity of the single infrared source illuminating the unknown gas sample. Thus, though a single radiation source is used in this gas analyzer, that radiation source must remain highly stable. The problem of stability of the radiation source is very similar to the problem of radiation source matching in the dual source systems and, in fact, in certain instances, is more severe than in the dual source systems since in the dual source systems drift will be very small if the two sources change proprotionately by causes such as a variation in the excitation voltage, whereas in this single source system a variation in the excitation voltage on the infrared source may cause a substantial drift in the output.

In addition to intensity variations of the source, it should be noted that any phenomena which may tend to detract from the optical qualities of the various optical windows in the radiation path will cause an effect similar to a variation in intensity in the radiation source. By way of example, dirt, condensation and the like on the windows will reduce the intensity of the radiation passing therethrough. In general, the optical windows in the chamber containing the high pressure gas and the chamber containing the lower pressure gas may be kept clean and free of condensation, etc., since these chambers may be caused to be located in a rather benign environment. However, the optical windows in the chamber receiving the unknown gas sample may not be easily kept free of condensation, etc., since they are repeatedly exposed to unknown gas samples which may contain various types of vapors and other contaminants which may detract from the optical qualities of the windows and/or absorb or reflect part of the broad band radiation passing through the gas.

Thus, it may be seen that the problems associated with gas analyzers having two infrared sources and two optical paths are not substantially alleviated by the use of one infrared source if two detectors are to be used, and that there remains a need for infrared gas analyzers which are relatively insensitive to the intensity of the radiation passing through the unknown gas sample and which are otherwise stable, do not require constant calibration and which are not subject to other environmental effects, such as, by way of example, mechanical vibration.

BRIEF SUMMARY OF THE INVENTION

Infrared gas analyzers for measuring the presence of specific gas molecules in an unknown gas sample. The apparatus of the preferred embodiment is comprised of an infrared radiation source illuminating the unknown sample through a unique absorption filter, and a single radiation detector for detecting the radiation passing through the unknown sample and, in conjunction with metering circuitry, for determining the concentration of the specific gas molecules in the unknown gas sample. The absorption filter is generally comprised of a plurality of transparent chambers mounted about an axis and rotatable so as to sequentially pass through a source of radiation, generally directed toward the unknown sample. The plurality of chambers are adapted so as to alternately filter out the characteristic absorption bands of the specific gas molecules being tested for, and to alternately pass radiation of the same energy content which will not be substantially absorbed by the gas being tested for. Thus, by placing the detector in a position so as to sense the radiation passing through the unknown sample, and by comparing the magnitude of the sequential signals derived therefrom, an accurate measure of the specific gas molecules in the unknown sample may be determined.

Various embodiments of such infrared absorption analyzer are disclosed, particularly in regard to various forms of the absorption filter used therewith and various orientations of the components of the system. One embodiment utilizes a fluorescent source, while another embodiment may be adapted to measure the concentration of a specific gas in a very large gas sample such as, by way of example, the earth's atmosphere.

BRIEF DESCRIPTION OF THE DRAWINGS

FIG. 2 is an end view of the rotating filter of FIG. 1 showing the filter chambers thereon.

FIG. 3-*a* is a diagram of a specific embodiment of the rotating filter of FIG. 1.

FIG. 3-*b* is a diagram of an alternate embodiment of the rotating filter of FIG. 1.

FIG. 3-*c* is a diagram of a further alternate embodiment of the rotating filter of FIG. 1.

FIGS. 4-*a* through 4-*f* are diagrams illustrating the radiation characteristics at various times and at various positions in the gas analyzer of FIG. 1 when using the rotating filter of FIG. 3-*a*.

FIGS. 6-*a* through 6-*d* are diagrams illustrating the absorption characteristics of the rotating filter of FIG. 3-*c* when used in the gas analyzer of FIG. 1.

DETAILED DESCRIPTION OF THE INVENTION

Figure 1:
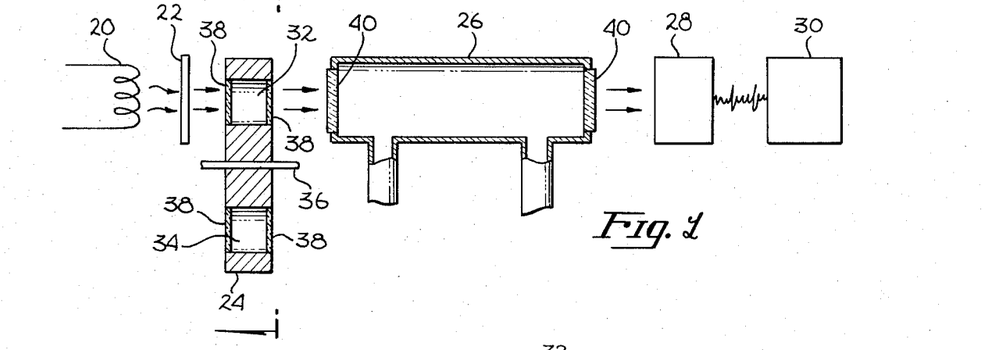
FIG. 1 is a block diagram of one embodiment of the present invention gas analyzer.

First referring to FIG. 1, a schematic representation of one embodiment of the gas analyzer of the present invention may be seen. In this embodiment, a source of infrared radiation 20, which typically may be a black body radiator, is adapted to direct infrared radiation through an interference filter 22, a special rotating infrared absorber, herein referred to as a rotating filter 24, a chamber 26 containing an unknown gas sample, and onto an infrared detector 28, the output of which is coupled to detector electronics 30 adapted to determine from the information in the detector signal the concentration of the specific gas being tested for in the unknown gas sample.

The infrared source 20 is characteristically comprised of a filament heated to a temperature to radiate primarily infrared radiation, though over a relatively wide band of wave lengths. The interference filter 22, of common construction, is adapted to limit the wave length band of the infrared radiation passing therethrough for reasons which will subsequently become apparent. The rotating filter 24 has a plurality of chambers therein, generally even in number, positioned around the axis of the rotating filter so that these chambers may be sequentially positioned in the path of the infrared radiation directed toward the sample tube 26 by rotation of the filter about its axis. By way of example, in the specific rotating filter 24 shown in FIG. 1, and in an end view in FIG. 2, two chambers 32 and 34 are positioned about axis 36 so as to alternately be presented within the path of the radiation directed toward the sample tube 26. The chambers 32 and 34 contain substantially transparent windows 38 on each face to allow the passage of infrared radiation therethrough (as shall be subsequently described it may be desired to slightly shade the transparent windows or one of such windows on one of the two chambers).

Similarly, the sample tube 26 has transparent windows 40 at each end thereof to allow the free passage of infrared radiation.

Figures 2, 3A, 3B, 3C:
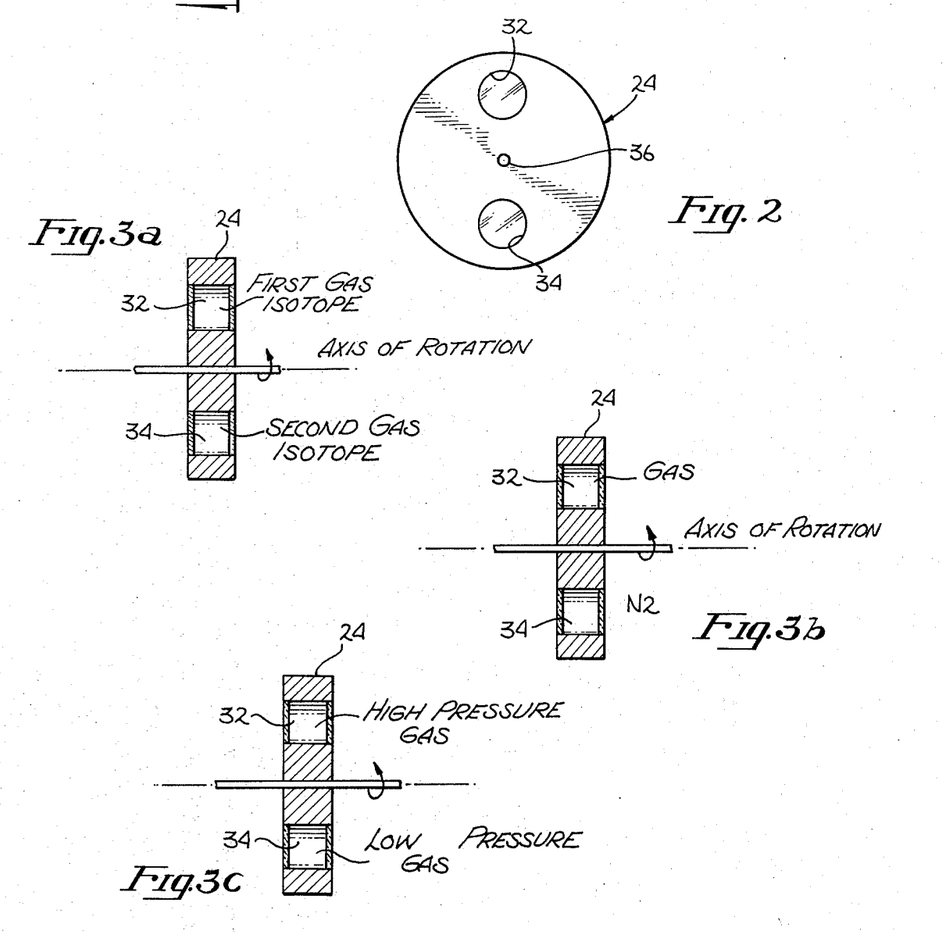

The rotating filter 24 is generally adapted to alternately absorb those wave lengths in the infrared radiation which ordinarly would be absorbed by the gas to be detected in the unknown sample, and to not substantially absorb these specific wave lengths. This characteristic may be achieved in a number of ways, such as, by way of example, is illustrated in FIGS. 3*a*-3*c*. For purposes of explanation only, the methods and apparatus of the present invention shall hereafter be specifically described with reference to gas analyzers for use in sensing carbon monoxide. However, it is to be understood as shall subsequently be explained more fully, that the methods and apparatus of the present invention may readily be adapted for use as analyzers for sensing other molecular gases. Thus, in FIG. 3*a*, chamber 32 is filled with the most common isotope of carbon monoxide, that is, $^{12}C^{16}O$ and chamber 34 is filled with a more rare stable isotope of carbon monoxide, such as $^{12}C^{18}O$. (Naturally comprising about 0.2% of all carbon monoxide). In general, the pressure of the gases in the two chambers should be equal and approximately equal to the pressures to be encountered in the unknown gas sample. Other isotopes may also be used in the chambers 34, such as $^{12}C^{17}O$ or $^{13}C^{16}O$, the principle of operation being the same as that described below. In fact, any two isotopes may be used in chambers 32 and 34 though the most common isotope should be used on one of the chambers if maximum or near maximum sensitivity is to be obtained.

Figure 4A:
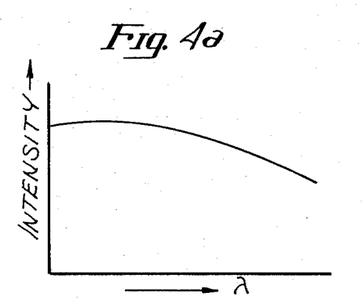
Figure 4B:
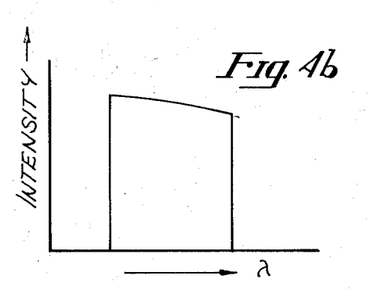
Figure 4C:
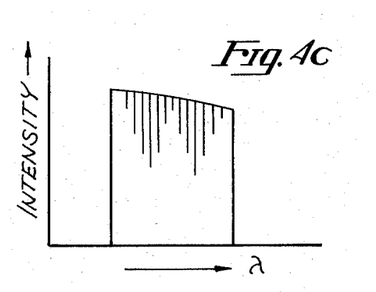
Figure 4D:
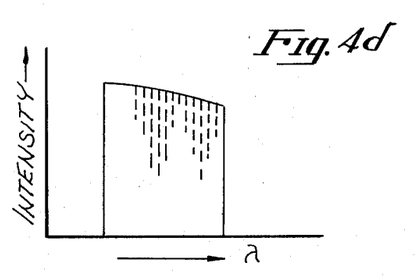

The operation of a system of FIG. 1 using the rotating filter of FIG. 3*a* may be explained with the aid of FIGS. 4*a* through 4*f*. FIG. 4*a* is a curve showing the intensity of the infrared radiation of the infrared radiator 20 versus wave length. Upon passing through interference filter 22, the wave length band of the infrared radiation is limited to approximately the band of interest, as shown ideally in FIG. 4*b*. On passing through chamber 32 filled with $^{12}C^{16}O$ the energy within the characteristic radiation absorption lines for $^{12}C^{16}O$, the most common isotope of carbon monoxide, will be absorbed so that the radiation transmitted through chamber 32 and into the sample tube 26 will be as shown in FIG. 4*c*. Alternately, as the rotating filter 24 moves to a position whereat the radiation passing through the interference filter 22 is incident upon the $^{12}C^{18}O$ in chamber 34, the energy in the characteristic radiation absorption lines for $^{12}C^{18}O$ in chamber will be absorbed so that the energy passing therethrough and incident upon the gas in the sample tube 26 will be as shown in FIG. 4*d*. The energy removed from the infrared radiation by the $^{12}C^{18}O$ may be caused to be substantially equal to the energy removed by the $^{12}C^{16}O$ in chamber 32, so that the energy transmitted through the rotating filter 24 into the sample tube 26 will be the same regardless of which chamber in the rotating filter the radiation passed through. However, the distribution of the energy versus wave length in the sample tube will be different since the absorption lines $^{12}C^{18}O$ are slightly displaced from those of $^{12}C^{16}O$. Thus, in FIG. 4D, the absorption lines of $^{12}C^{18}O$ have been shown as dashed lines for the purpose of more clearly distinguishing the two absorption spectra, both in source and in wave length.

If one sample tube 26 is evacuated, the radiation spectra of FIG. 4c and of FIG. 4d will alternately be transmitted through the sample tube and impinge on the infrared detector, so that by measuring the output of the infrared detector 28 in synchronizm with the rotating filter 24, and subtracting the output measured when chamber 32 is in the optical path from the output measured when chamber 34 is in the optical path, no signal will be obtained, indicating the absence of carbon monoxide in the sample tube 26. If a gas other than carbon monoxide is admitted to the sample tube which has its own absorption characteristics, the intensity of the infrared radiation passing through sample tube 26 and impinging on infrared detector 28, will be reduced thereby. However, since the absorption characteristics of this gas will not be the same as either $^{12}C^{16}O$ or $^{12}C^{18}O$, the radiation impinging on the infrared detector 28 will be the same (though reduced) regardless of whether chamber 32 or chamber 34 is aligned with the optical path. Consequently, the signal derived by the electronics 30 will again indicate that no carbon monoxide is present.

Figure 4E:
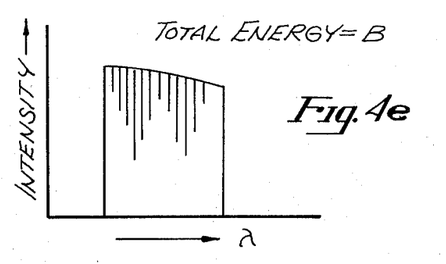
Figure 4F:
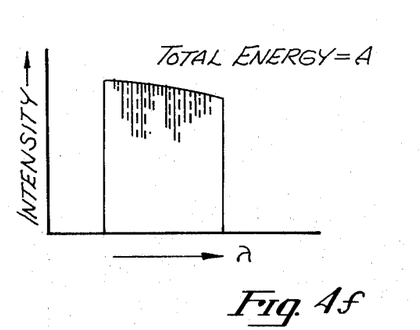

When a gas containing carbon monoxide is admitted to the sample tube 26, the radiation passing through chamber 32 and incident upon the unknown gas sample in the sample tube 26 will be transmitted through the sample tube to the infrared detector 28 without substantial reduction in total energy content, at least due to the presence of carbon monoxide in the unknown gas sample, because the energy in the characteristic infrared absorption lines of the most common isotope of carbon monoxide was previously removed from the radiation on the unknown gas sample by the gas contained in chamber 32. Thus, the intensity of the infrared radiation initially passing through chamber 32 incident upon infrared detector 28 is as shown in FIG. 4e and, in general, will be substantially the same as that shown in FIG. 4c. However, when chamber 34 is aligned with the optical path and the intensity spectrum of FIG. 4d is imposed on the unknown gas sample, the most common isotope of the carbon monoxide in the unknown gas will further absorb the infrared radiation in proportion to the total content of carbon monoxide, and the infrared radiation spectrum incident upon the infrared detector 28 will be as shown in FIG. 4f. Thus, it may be seen that the total energy in the spectrum of FIG. 4e is greater than that of FIG. 4f since only the absorption lines for the $^{12}C^{16}O$ have been removed from the spectrum of FIG. 4e, whereas the absorption lines for both $^{12}C^{16}O$ and $^{12}C^{18}O$ have been removed from the spectrum of FIG. 4f. Consequently, the electronics 30 will compare these two signals and derive a signal proportional to the difference therein. However, for reasons which are about to be described, this signal, though indicative of the concentration of carbon monoxide in the unknown sample, is not used as a direct output of the infrared detector.

For convenience, the total energy in the spectrum of FIG. 4e shall be represented as B and the total energy in the spectrum of 4f shall be represented by A. Thus, as hereinabove described, electronics 30 is adapted to provide a signal equal to B-A. It is apparent, however, that if the windows 40 on the sample tube 26 become dirty, etc., or the infrared radiator 20 changes intensity, the energy received by the infrared detector 28 will vary accordingly. Thus, though B and A will change by some fixed proportion and the quantity B-A will similarly change by the same proportion. In order to eliminate this sensitivity to radiation level, it has been found desirable to provide as the ultimate indication of the carbon monoxide concentration in the unknown sample a signal proportional to the quantity (B-A)/B, (B-A)/A also being suitable. This has the net effect of normalizing the quantity B-A by a parameter indicative of the radiation intensity level so as to remove from the output signal any significant dependency on the intensity of the infrared radiator, the optical properties of the windows in the sample tube, etc.

It should be noted that drifts in the sensitivity of the infrared detector 28 do not substantially affect the stability and accuracy of the infrared gas analyzer. By way of example, if the sensitivity, that is, the scale factor of the infrared detector 28, should change, both A and B will change accordingly and the quantity (B-A)/B will remain constant. This is in comparison to the system of U.S. Pat. No. 3,488,491, hereinbefore described in the prior art section, wherein a change or drift in sensitivity of one detector without an identical change in the outer detector, may create a gross error in the output signal. Similarly, a shift in the bias level or of the sensitivity of the infrared detector 28 will not substantially detract from the sensitivity and accuracy of the present invention analyzer. By way of example, if one of the detectors in the above referenced patent has a drift of 0.1% in output voltage level, this will represent a substantial shift in the system output, since the output of that system is dependent upon the difference in signals received from the two detectors. Consequently, even small drifts in the output of either detector will yield a substantial error in the system output signal, indicating an equivalent fixed concentration error independent of the concentration of the gas being detected in the unknown gas sample. Thus, for gas concentration in the unknown gas sample on the order of, or lower than, the equivalent drift in either of the detectors, the output signal of that system is meaningless in terms of concentration in the unknown gas sample.

The primary source of error in the gas analyzer of the present invention is a change in the optical qualities of the windows on one of chambers 32 or 34 on the rotating filter 24 without an equivalent change in optical quality on the windows of the other chamber. This has the effect of changing A or B without changing the other signal so that the difference in the two signals B-A may undergo a substantial change, thereby creating a substantial error expressible primarily as a percentage of full scale. However, as hereinbefore mentioned, the rotating filter 24 is not exposed to the sample gas and is not subject to contamination by various gas samples. Furthermore, the rotating filter 24 may be assured an even more benign environment by properly enclosing the rotating filter within an enclosure which may also be provided with transparent windows in the optical path. It is, of course, not necessary for the window in the enclosure to maintain perfectly constant optical characteristics since a change in optical characteristics of such windows will affect both A and B proportionately so that the quantity (B-A)/B will not change.

It should be noted also that the use of one of the lesser common but stable isotopes in chamber 34 has specific advantages in that the bands of infrared energy absorption of such an isotope are interspersed between the energy bands absorbed by the more common isotope. Thus even though the wave lengths absorbed by the two gases are different, they are not grossly different, so that condensation, contaimination, and the like, on the various optical windows will not have sufficient wave length dependent optical characteristics to filter the energy band passed by chamber 32 and chamber 34 in a significantly different manner.

Figure 5:
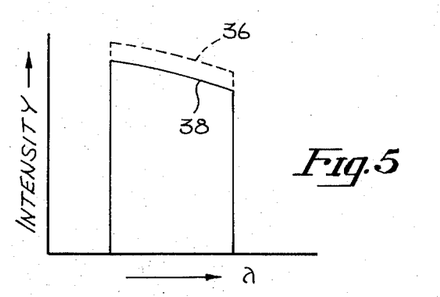
FIG. 5 is a diagram illustrating the intensity of the radiation passing through the nitrogen filled chamber of the rotating filter of FIG. 3-*b*, when used in the gas analyzer of FIG. 1, in comparison with the radiation incident upon that chamber.

Now referring to FIG. 3b, an alternate form for the rotating filter 24 of the system of FIG. 1 may be seen. In this case, chamber 32 is filled with $^{12}C^{16}O$ and chamber 34 is filled with a substantially infrared neutral gas, such as, by way of example, nitrogen, though any infrared neutral has may be used, such as diutome gases (Helium, Neon, Argon, Xeron, Cryptom, Hydrogen, Oxygen, etc). Since chamber 32 is, in essence, the same as chamber 32 in the form of rotating filter shown in FIG. 3a, the energy spectrum at the detector when chamber 32 is aligned with the optical path of the system, and the sample tube is evacuated, will be as shown in FIG. 4e. The nitrogen, on the other hand, is substantially infrared insensitive so that, in general, the infrared radiation passing through the interference filter shown in FIG. 4b, and repeated in phantom line 36 in FIG. 5, would normally be incident upon the infrared detector 28 when chamber 34 was aligned with the optical path of the system. However, in order to equalize the A and B signals when there is no carbon monoxide in the sample tube 26, it is necessary to slightly reduce the amount of radiation on the infrared detector, such as is shown in FIG. 5 by line 38. This may be achieved in any convenient manner, such as, by way of example, placing a slight, preferably wave length insensitive, filter adjacent to the windows of chamber 34, or by suitable proportioning of apertures on chambers 32 and 34. Thus, the difference in energy between lines 36 and line 38 is selected to be equal to the energy removed from the envelope of FIG. 4b by the $^{12}C^{16}O$ in chamber 32 as shown in FIG. 4e.

The operation of this embodiment is substantially the same as that hereinbefore described with respect to the embodiment using the rotating filter of FIG. 3a, with the radiation passing through chamber 32, already missing the characteristic energy bands for the most common isotope of carbon monoxide, undergoing little further decrease by the presence of any carbon monoxide in the sample tube 26, whereas the radiation passing through the nitrogen in chamber 34 will be subject to substantial absorption at the characteristic wave lengths in relation to the amount of carbon monoxide in the sample tube.

Figure 6A:
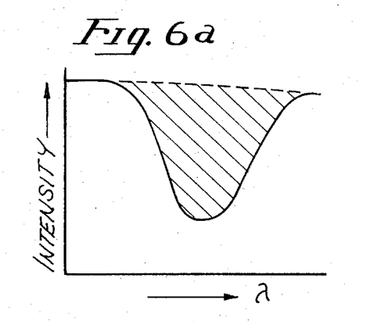
Figure 6B:
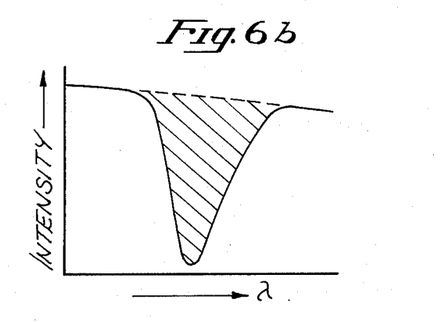
Figure 6C:
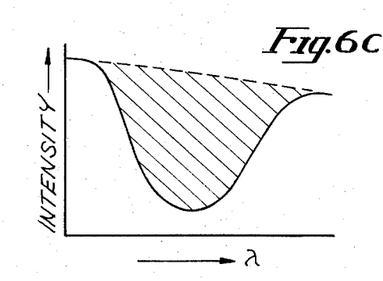
Figure 6D:
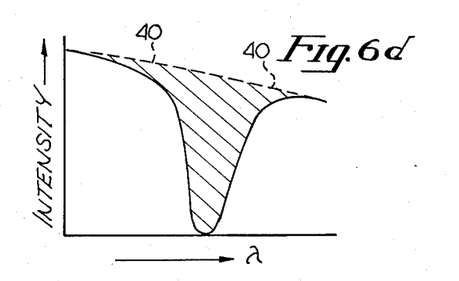

A further alternate embodiment for the rotating filter is shown in FIG. 3c. In this embodiment, chamber 32 is filled with $^{12}C^{16}O$ at one pressure, whereas chamber 34 is filled with lower pressure $^{12}C^{16}O$. Thus, the gases in the two chambers have infrared energy absorption lines centered on substantially the same wave lengths. However, because of the difference in pressure in the two chambers, the width of the energy absorption lines is different. Specifically, the higher pressure gas will exhibit broader energy absorption lines than the lower pressure gas since the higher pressure results in spectral broadening of the absorption phenomena. Thus, looking at any of the absorption lines hereinbefore represented merely as lines, such as in FIGS. 4c and 4f, and FIG. 5b, each line for the higher pressure gas will appear as shown in FIG. 6a, whereas the line characteristic of the lower pressure gas will be narrower, as shown in FIG. 6b. In the preferred embodiment, the higher pressure gas is approximately at one atmosphere, the pressure which will generally be encountered in the unknown gas sample, whereas the lower pressure gas is at a pressure in the order of one-tenth to one-third of an atmosphere. When the radiation of FIG. 6a passes through an unknown sample containing carbon monoxide, the radiation will undergo little further reduction since the absorption characteristics of the carbon monoxide in the unknown gas sample are the same as the absorption characteristics of the higher pressure gas in the rotating filter. However, when the radiation of FIG. 6b passes through the unknown gas sample, the carbon monoxide therein will absorb some of the radiation, particularly in the areas 40 to each side of the wave length of peak absorption. Thus, the balance in the A and B signals will be disturbed in proportion to the amount of carbon monoxide in the test sample, thereby giving the desired output signal. In general, in order to achieve initial balance of the A and B signals with no carbon monoxide in the unknown sample, chambers 32 and 34 may be adapted to have equal optical lengths, say by making chamber 34 containing the lower pressure gas longer in the optical path than the chamber 32 approximately in proportion to the ratio of pressures within the two chambers.

Figure 7:
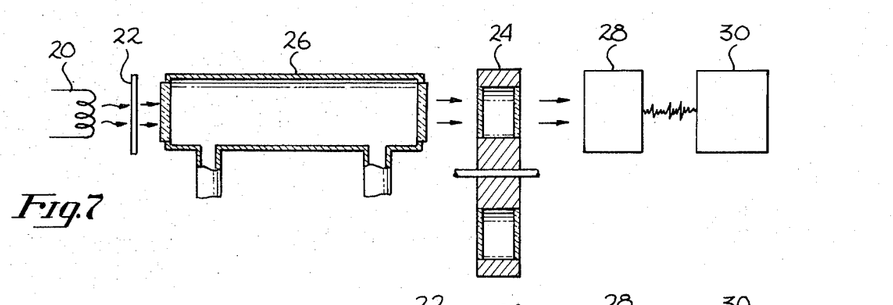
FIG. 7 is a block diagram of an alternate embodiment of the present invention gas analyzer.
Figure 8:
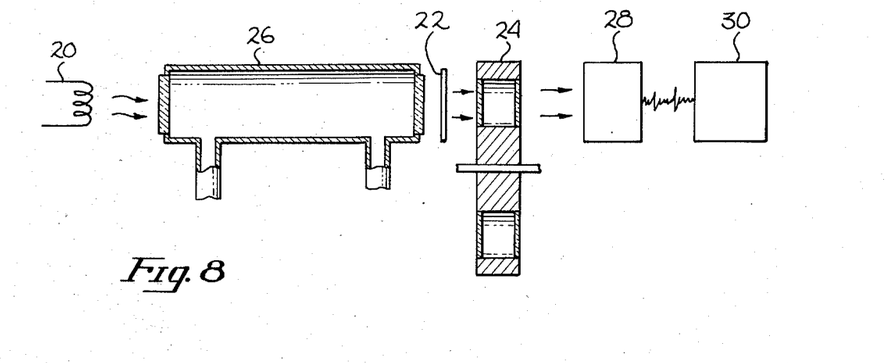
FIG. 8 is a block diagram of a further alternate embodiment of the present invention gas analyzer.

Now referring to FIGS. 7 and 8, alternate arrangements for the components of the system of FIG. 1 may be seen. In FIG. 7, the position of the rotating filter 24 has been changed from a point immediately in front of the sample tube 26 to a point immediately aft of the sample tube. The function of the various components in the system on FIG. 7 is the same as that of the components of FIG. 1 and the theory of operation of the system is substantially the same. However, the rotating filter filters out the selected energy bands, dependent upon content of the chambers in the rotating filter, after the energy passes through the unknown gas sample rather than before. In the system of FIG. 8, the interference filter 22 has also been changed from a position forward of the sample tube 26 to a position immediately aft of the sample tube. Thus, in this system, the unknown gas sample is subjected to a generally broad band infrared radiation with the interference filter 22 and the rotating filter 24 performing the respective operations on the radiation after passing through the unknown gas sample.

It should be noted that the system of FIG. 8 is particularly useful in certain applications where the size of the unknown gas sample may reasonably preclude access to both ends of the unknown sample, so to speak. By way of example, it may be desired to measure the average concentration of gases, such as carbon monoxide, in the atmosphere. In such a situation, the sample tube 26 actually comprises tha atmosphere itself and a physical sample tube as such, is not practical. Similarly, a source of infrared energy, such as a heated filament, is also not practical. However, the earth directs considerable infrared energy upward through the atmosphere. Therefore, the interference filter 22, the rotating filter 24, the infrared detector 28, and electronics 30 may be mounted in an orbiting space vehicle, and oriented to optically view the infrared radiation directed upward through the atmosphere. Since the system of the present invention is substantially insensitive to variations in the energy level of the infrared source, and since the system is substantially free of drift so as to not require repeated recalibration, such a system will provide an accurate measure of the average carbon monoxide content in the atmosphere throughout a reasonable range of variation and intensity of the infrared energy directed upward through the atmosphere.

Figure 9:
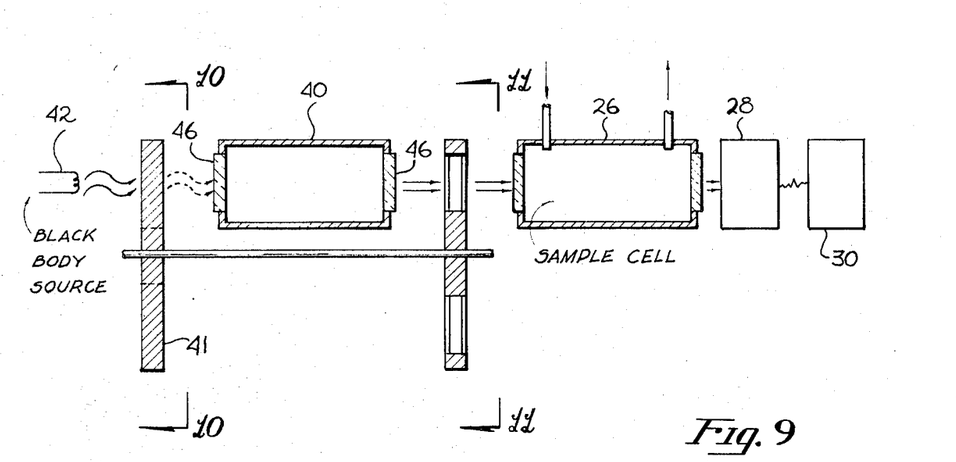
FIG. 9 is a block diagram of a further alternate embodiment of the present invention, utilizing an infrared fluorscent source in conjunction with the gas analyzer of FIG. 1.
Figure 10:
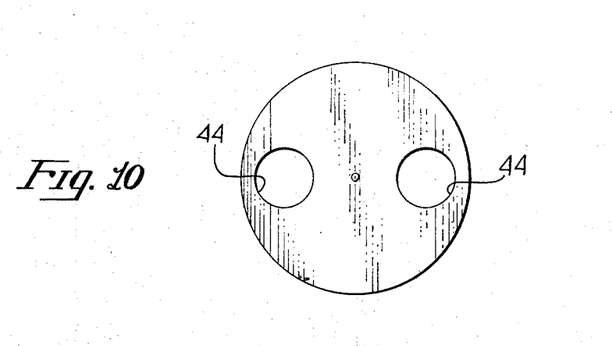
FIG. 10 is an end view of the shutter arrangement of the gas analyzer of FIG. 9 taken along lines 10—10 of that figure.
Figure 11:
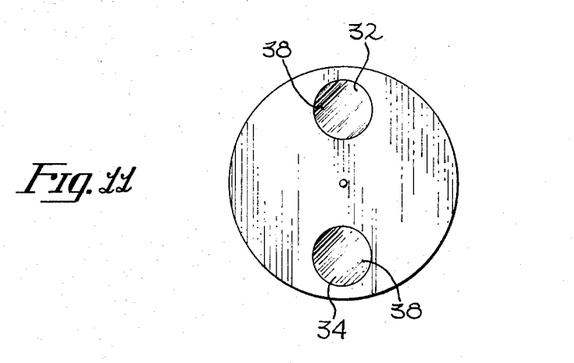
FIG. 11 is an end view of a rotating filter of FIG. 9 taken along lines 11—11 of that figure.

Now referring to FIG. 9, a further alternate embodiment of SO present invention utilizing a fluorescent source as opposed to a relatively broad band infrared source, may be seen. The system shown specifically in FIG. 9 utilizes a rotating selected 24 of FIG. 3a wherein chamber 32 contains $^{12}C^{16}O$ and chamber 34 contains $^{12}32180$. However, instead of illuminating the filter from a source of infrared energy filtered through an interference filter, the rotating filter is illuminated by the stimulated emission at selected wave lengths from a fluorescent source 40 which in turn is stimulated through a shutter mechanism 4 mounted on the same shaft as filter 24 and rotating in synchronism therewith by an infrared source 42. It may be seen from FIG. 9, and also from FIGS. 10 and 11, showing views taken along lines 10—10 and 11—11 respectively, of FIG. 9, that the opening from the shutter system 4 are purposely misaligned with chambers 32 and 34.

Fluorescent source 40 is comprised of a chamber having infrared transparent windows 46 at each end thereof and being filled with an approximately equal mixture, by way of example, of $^{12}C^{16}O$ and $^{12}C^{18}O$. Infrared emission at the characteristic wave lengths for each of these gases may be stimulated by exposing the gases to a source of infrared energy, with the emission tending to decay with a relatively short time constant after the infrared stimulation is terminated (the time constant may be increased by putting an infrared reflective coating, such as gold, on the inside of chamber 40 so that the portion of the emission which is not directed outward through the windows in the chamber will be reflected to re-stimulate some of the gas therein). The operation of the system shown in FIG. 9 may be explained as follows: upon rotation of shaft 36, the shutter system 4 periodically exposes tha gas in fluorescent source 40 to the infrared source 42. This stimulates emission from the gas which continues after the shaft 36 has rotated so that shutter system 4 blocks further stimulation from infrared source 42 and aligns one of chambers 32 and 34 with the optical path between the fluorescent source 40 and the sample cell 26. Thus, the stimulation emission from fluorescent source 40 is directed through the rotating filler 24, through the sample cell 26, etc., in much the same manner as was hereinbefore described with respect to the system of FIG. 1. However, one significant difference in terms of operation of the system of FIG. 9 as compared the system of FIG. 1 is that the radiation imposed on the unknown gas sample, and thereafter on the infrared detector 28, is limited to only those wave lengths characteristically emitted (and absorbed) by $^{12}C^{16}O$ and $^{12}C^{18}O$. Thus, the sample cell, rather than being exposed to infrared radiation over a substantial wave length band as shown in FIG. 4b, is subjected only to two specific sets of wave length lines characteristic of the two materials, one of which will be substantially absorbed in accordance with the concentration of carbon monoxide in the sample cell 26. The net effect is that the substantially large amount of broad band infrared energy is not imposed on the infrared detector, allowing the use of detectors having improved sensitivities and characteristics without tending to cause detector saturation and like problems. (As an alternative, the gas in chamber 40 may be illuminated from the side so that little if any of the stimulating illuminations is free to pass outward toward the rotating filter).

It is to be recognized that the present invention has been described in specific detail with respect to infrared gas analyzers adapted for sensing and measuring the concentration of carbon monoxide in an unknown gas sample for purposes of explanation only, and with no intent to imply a limitation of the principles of the present invention to carbon monoxide gas analyzers. Other gas analyzers may readily be fabricated for the detection of other gases exhibiting infrared absorption characteristics. By way of specific example, it was herein described with reference to FIG. 3a that chambers 32 and 34 might be filled with any two of the following isotopes of carbon monoxide —

$^{12}C^{16}O$, $^{12}C^{17}O$, $^{12}C^{18}O$ and $^{13}C^{16}O$, where $^{12}C$ is the most common isotope of carbon and $^{16}O$ is the most common isotope of oxygen. Thus, with the combination of $^{12}C^{16}O$ and $^{12}C^{17}O$ or $^{12}C^{18}O$, it is the difference in the infrared characteristics caused by the two oxygen isotopes which are sensed, whereas in the $^{12}C^{16}O$ and $^{13}C^{16}O$ combination it is the differences in the infrared characteristics caused by the two carbon isotopes which are sensed. Thus, in a similar manner, other molecular gases which contain either carbon or oxygen may be sensed, such as $CO_2$, NO, $NO_2$, $SO_2$ and most hydrocarbons, either by sensing differences in the carbon or oxygen isotopes, or by sensing changes in isotopes of the other elements involved, such as nitrogen. For a $CO_2$ detector, the isotopes suitable for use with the apparatus of the present invention include $^{12}C^{16}O^{16}O$, $^{12}C^{16}O^{17}O$, $^{12}C^{16}O^{18}O$ and $^{13}C^{16}O^{16}O$, with $^{12}C^{16}O^{16}O$ being the most common and the preferred isotope for use (alone or in conjunction with one of the others, depending on the specific embodiment of the present invention utilized). For an NO detector, the isotopes suitable for use include $^{14}N^{16}O$, $^{14}N^{17}O$, $^{14}N^{18}O$ and $^{15}N^{16}O$, with $^{14}N^{15}O$ being the most common isotope. For an $NO_2$ detector, the isotopes suitable for use include $^{14}N^{16}O^{16}O$, $^{14}N^{16}O^{17}O$, $^{14}N^{16}O^{18}O$ and $^{15}N^{16}O^{16}O$ with $^{14}N^{16}O^{16}O$ being the most common. For an $SO_2$ detector, the isotopes suitable for use include $^{32}S^{16}O^{16}O$, $^{32}S^{16}O^{17}O$ and $^{32}S^{16}O^{18}O$, with $^{32}S^{16}O^{16}O$ being the most common. Other gaseous compounds may also be detected using the principles of the present invention, such as, by way of specific example, HC1, using the isotopes $^{1}H^{35}C1$ and/or $^{1}H^{37}C1$. The isotopes listed above, as well as any of the other well known and stable isotopes exhibiting infrared absorption characteristics may be used in any of the embodiments of the present invention disclosed herein.

It should also be noted that the word "filled" as used herein has been used in the general sense to indicate the predominate presence of the particular isotope in question, or an enriched quantity of the particular isotope of the gas in question, and a general absence or at least substantially reduced quantities of other gases exhibiting similar infrared phenomena and having a reasonable likelihood of having a concentration in an unknown sample which is relatively independent of the particular gas in question. Thus, a chamber "filled" with $^{12}C^{16}O$ might be filled with naturally occurring CO since such CO is on the order of 99 percent $^{12}C^{16}O$ and the proportion of the isotopes of CO is not likely to vary in an unknown gas sample. Similarly, a chamber filled with one of the less common isotopes in general need only contain an enriched proportion of the isotope, e.g., enriched to a concentration substantially higher than the naturally occurring concentration, though the performance of the detector will generally be improved if the chamber is filled with the nearly pure isotope. Also, specific embodiments and specific arrangements of the components of the present invention have been described merely as examples of some of the embodiments and arrangements that may readily be selected by one skilled in the art. Thus, while the invention has been particularly shown and described with reference to certain preferred embodiments thereof, if will be understood by those skilled in the art that various changes in form and details may be made therein without departing from the spirit and scope of the present invention.

We claim:

1. An infrared absorption gas analyzer for measuring the presence of a specific gas in an unknown gas sample comprising:
   a source of infrared radiation directed along an optical path;
   a rotating filter having at least first and second chambers disposed about an axis and a means for rotating said chambers about said axis so as to alternately dispose each of said chambers within said optical path, each of said chambers having at least partially infrared transparent windows therein, said first chamber containing a substantial amount of a first stable isotope of said specific gas and said second chamber containing a substantial amount of a second stable isotope of said specific gas which is less common than said first stable isotope so that the relative proportions of said first and second isotopes in said first and second chambers are substantially different, said first and second chambers being filled so to remove substantially equal amounts of infrared energy when disposed in said optical path;
   means for disposing an unknown gas sample within said optical path and sensing means repetitively responsive to radiation passing through said first chamber and said gas sample to provide a first signal, and radiation passing through said second chamber and said gas sample to provide a second signal, said sensing means including a means for providing an output signal responsive to the difference in said first and second signals divided by one of said first and second signals;
   said optical path being in fixed predetermined spatial relationship with respect to said source of infrared radiation, the axis of rotation of said rotating filter, said means for disposing an unknown gas sample within said optical path and said sensing means.

2. The gas analyzer of claim 1 wherein said first and second chambers containing said first and second isotopes are filled so that the amount of energy removed by said first chamber from relatively broad band infrared radiation from said infrared source is substantially the same as the amount of energy removed from the same radiation by said second chamber.

3. The gas analyzer of claim 1 wherein said rotating filter, except for said chambers, is substantially opaque to infrared light so as to terminate radiation along said optical path except when one of said chambers is aligned with said optical path.

4. The gas analyzer of claim 1 for measuring the presence of carbon monoxide wherein said first chamber is filled with $^{12}C^{16}O$ and said second chamber is filled with an isotope of carbon monoxide selected from the group consisting of $^{12}C^{17}O$, $^{12}C^{18}O$ and $^{13}C^{16}O$.

5. The gas analyzer of claim 1 for measuring the presence of carbon dioxide wherein said first chamber is filled with $^{12}C^{16}O^{16}O$ and said second chamber is filled with an isotope of carbon dioxide selected from the group consisting of $^{12}C^{16}O^{17}O$, $^{12}C^{16}O^{18}O$ and $^{13}C^{16}O^{16}O$.

6. The gas analyzer of claim 1 for measuring the presence of NO wherein said first chamber is filled with $^{14}N^{16}O$ and said second chamber is filled with an isotope of NO selected from the group consisting of $^{14}N^{17}O$, $^{14}N^{18}O$ and $^{15}N^{16}O$.

7. The gas analyzer of claim 1 for measuring the presence of $SO_2$ wherein said first chamber is filled with $^{32}S^{16}O^{16}O$ and said second chamber is filled with an isotope of $SO_2$ from the group consisting of $^{32}S^{16}O^{17}O$, $^{32}S^{16}O^{18}O$ and $^{21}S^{18}O^{18}O$.

8. The gas analyzer of claim 1 for measuring the presence of $NO_2$ wherein said first chamber is filled with $^{14}N^{16}O^{16}O$ and said second chamber is filled with an isotope of $NO_2$ selected from the group consisting of $^{14}N^{16}O^{17}O$, $^{14}N^{16}O^{18}O$ and $^{15}N^{16}O^{16}O$.

9. The gas analyzer of claim 1 for measuring the presence of hydrochloric acid wherein said first chamber is filled with $^{1}H^{35}Cl$ and said second chamber is filled with $^{1}H^{37}Cl$.

10. An infrared absorption gas analyzer for measuring the presence of a specific gas in an unknown gas sample comprising:
   a source of infrared radiation directed along an optical path;
   a rotating filter having at least first and second chambers disposed about an axis and a means for rotating said chambers about said axis so as to alternately dispose each of said chambers within said optical path, each of said chambers having at least partially infrared transparent windows therein, said first chamber containing at least a substantial proportion of a first stable isotope of said specific gas and said second chamber containing at least a substantial proportion of a second stable isotope of said specific gas which is less common than said first stable isotope so that the relative proportions of said first and second isotopes in said first and second chambers are substantially different, said first and second chambers being filled so to remove substantially equal amounts of infrared energy when disposed in said optical path;
   a sample cell having at least partially transparent infrared windows for confining a gas sample;
   an infrared detector for detecting infrared energy from said sample cell and for providing an electrical signal responsive thereto; and
   electronic means coupled to said infrared detector and synchronized with respect to said rotating filter to create a first signal responsive to radiation from said infrared radiation source through said first chamber and said sample cell, and a second signal responsive to radiation from said infrared radiation source through said second chamber and said sample cell, and to provide a signal responsive to the difference in said first and second signals all divided by one of said first and second signals;
   said optical path being in fixed predetermined relationship with respect to said source of infrared radiation, said rotating filter, said sample cell and said infrared detector, the immediately preceding elements being arranged along said optical path in the order of recitation herein.

11. The gas analyzer of claim 10 wherein said first and second chambers containing said first and second isotopes are filled so that the amount of energy removed by said first chamber from relatively broad band infrared radiation from said infrared source is substantially the same as the amount of energy removed from the same radiation by said second chamber.

12. The gas analyzer of claim 10 wherein said rotating filter, except for said chambers, is substantially opaque to infrared light so as to terminate radiation along said optical path except when one of said chambers is aligned with said optical path.

13. The gas analyzer of claim 10 for measuring the presence of carbon monoxide wherein said first chamber is filled with $^{12}C^{16}O$ and said second chamber is filled with an isotope of carbon monoxide selected from the group consisting of $^{12}C^{17}O$, $^{12}C^{18}O$ and $^{13}C^{16}O$.

14. The gas analyzer of claim 10 for measuring the presence of carbon dioxide wherein said first chamber is filled with $^{12}C^{16}O^{16}O$ and said second chamber is filled with an isotope of carbon dioxide selected from the group consisting of $^{12}C^{16}O^{17}O$, $^{12}C^{16}O^{18}O$ and $^{13}C^{16}O^{16}O$.

15. The gas analyzer of claim 10 for measuring the presence of NO wherein said first chamber is filled with $^{14}N^{16}O$ and said second chamber is filled with an isotope of NO selected from the group consisting of $^{14}N^{17}O$, $^{14}N^{18}O$ and $^{15}N^{16}O$.

16. The gas analyzer of claim 10 for measuring the presence of $SO_2$ wherein said first chamber is filled with $^{32}S^{16}O^{16}O$ and said second chamber is filled with an isotope of $SO_2$ selected from the group consisting of $^{32}S^{16}O^{17}O$, $^{32}S^{16}O^{18}O$ and $^{32}S^{18}O^{18}O$.

17. The gas analyzer of claim 10 for measuring the presence of $NO_2$ wherein said first chamber is filled with $^{14}N^{16}O^{16}O$ and said second chamber is filled with an isotope of $NO_2$ selected from the group consisting of $^{14}N^{16}O^{17}O$, $^{14}N^{16}O^{18}O$ and $^{15}N^{16}O^{16}O$.

18. The gas analyzer of claim 10 for measuring the presence of hydrochloric acid wherein said first chamber is filled with $^{1}N^{35}Cl$ and said second chamber is filled with $^{1}H^{37}Cl$.

* * * * *